United States Patent
Hershberger et al.

(10) Patent No.: US 10,858,789 B2
(45) Date of Patent: Dec. 8, 2020

(54) HOLLOW, COMPOSITE DOWEL BAR ASSEMBLIES, ASSOCIATED FABRICATION METHODOLOGY, AND APPARATUS

(71) Applicant: Composite Rebar Technologies, Inc., Portland, OR (US)

(72) Inventors: Thomas A. Hershberger, Madison, WI (US); Nicholas K. Cray, Madison, WI (US)

(73) Assignee: Composite Rebar Technologies, Inc., Madison, WI (US)

( * ) Notice: Subject to any disclaimer, the term of this patent is extended or adjusted under 35 U.S.C. 154(b) by 0 days.

(21) Appl. No.: 15/710,766

(22) Filed: Sep. 20, 2017

(65) Prior Publication Data

US 2018/0080181 A1 Mar. 22, 2018

Related U.S. Application Data

(60) Provisional application No. 62/397,320, filed on Sep. 20, 2016.

(51) Int. Cl.

| | |
|---|---|
| *E01C 11/14* | (2006.01) |
| *B29C 69/00* | (2006.01) |
| *B29C 70/52* | (2006.01) |
| *B29C 70/68* | (2006.01) |
| *B29C 70/86* | (2006.01) |

(52) U.S. Cl.
CPC ............ *E01C 11/14* (2013.01); *B29C 69/001* (2013.01); *B29C 70/521* (2013.01); *B29C 70/682* (2013.01); *B29C 70/865* (2013.01)

(58) Field of Classification Search
CPC ..... E01C 11/14; B29C 69/001; B29C 70/521; B29C 70/682; B29C 70/865
USPC ......................................... 404/51, 52, 59–70
See application file for complete search history.

(56) References Cited

U.S. PATENT DOCUMENTS

| | | | | |
|---|---|---|---|---|
| 6,123,485 | A * | 9/2000 | Mirmiran ................ | E02D 31/02 405/232 |
| 6,171,016 | B1 * | 1/2001 | Pauls ...................... | E01C 11/14 404/59 |
| 9,440,400 | B2 * | 9/2016 | Gibson ................... | E01C 11/14 |
| 2005/0265802 | A1 * | 12/2005 | Miller .................... | E01C 11/14 411/351 |
| 2008/0060298 | A1 * | 3/2008 | Fahim ...................... | E04C 5/07 52/309.14 |
| 2015/0298399 | A1 * | 10/2015 | Androsch ............ | B21D 35/006 264/134 |
| 2016/0017548 | A1 * | 1/2016 | Schenk ................... | E01C 11/14 404/62 |

* cited by examiner

*Primary Examiner* — Raymond W Addie
(74) *Attorney, Agent, or Firm* — Kolisch Hartwell, P.C.

(57) ABSTRACT

Hollow composite dowel bar assemblies, their manufacture, and apparatus for manufacture. The dowel bar assemblies may include an elongate and hollow core, a protective jacket coating at least the sidewall exterior of the core, and a sealing structure coupled with each end of the combined core and jacket, that are configured to protect the core from the environment.

27 Claims, 6 Drawing Sheets

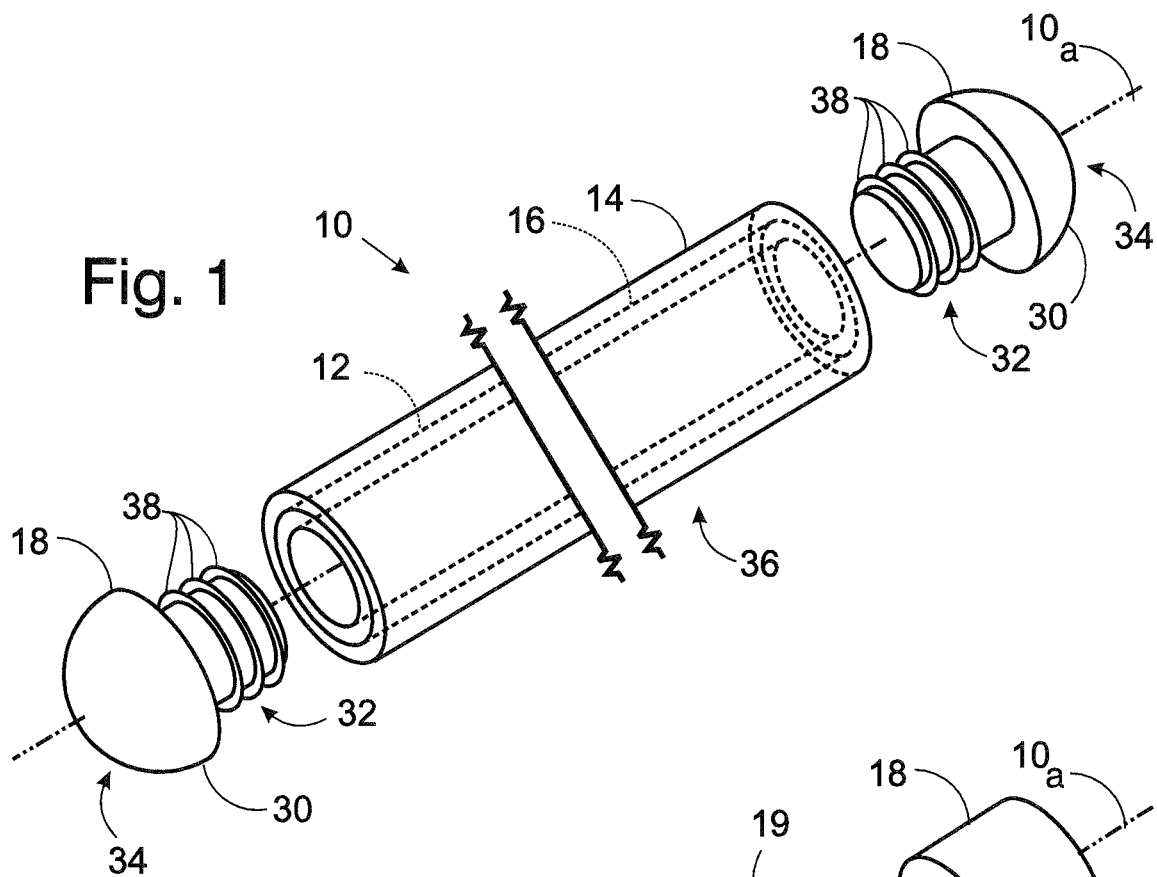
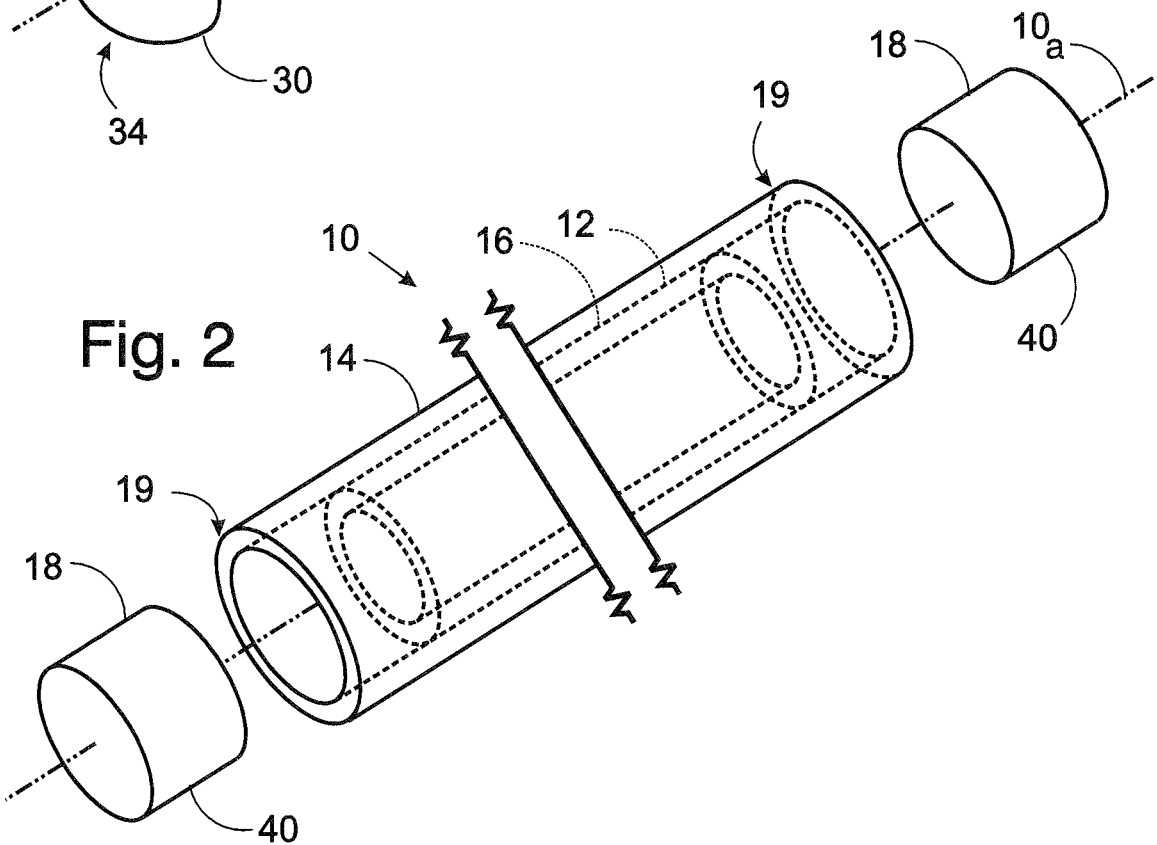

HOLLOW, COMPOSITE DOWEL BAR ASSEMBLIES, ASSOCIATED FABRICATION METHODOLOGY, AND APPARATUS

CROSS-REFERENCES

This application claims the benefit under 35 U.S.C. § 119(e) of the priority of U.S. Provisional Patent Application Ser. No. 62/397,320, filed Sep. 20, 2016, the entirety of which is hereby incorporated by reference for all purposes.

The following related applications and materials are incorporated herein, in their entireties, for all purposes: U.S. Provisional Application No. 61/595,042, U.S. Patent Publication No. 2013/0202355, U.S. Pat. No. 8,591,139, U.S. Patent Publication No. 2016/0076249, and U.S. Patent Publication No. US 2017/0058463.

FIELD

This disclosure relates to dowel bars for use in concrete structures. More specifically, this disclosure relates to hollow dowel bar assemblies that incorporate composite materials, apparatus for manufacturing the hollow dowel bar assemblies, and methods of manufacturing the hollow dowel bar assemblies.

BACKGROUND

Dowel bars are ubiquitous in concrete highway construction. They are typically elongate, cylindrical, high-shear-strength, smooth-exterior rods formed of conventional structural steel. Dowel bars may be employed in multiple numbers, for example at 1-foot lateral-spacing intervals, as shear-bridging, slab-to-slab load-transfer components at the joints which exists between adjacent, travel-direction-oriented, highway slabs formed of poured concrete.

When properly installed, dowel bars provide appropriate load-transfer shear strength between adjacent slabs while at the same time (a) accommodating slab expansion and contraction (with slight, but recurrent, slab-joint openings and closings) due to ambient thermal changes, and additionally (b) minimizing the phenomenon known as slab faulting at the joints between adjacent slabs. Dowel bars may also be useful when employed for highway retrofit processes, such as to address cracks or other flaws in an existing concrete highway.

One limitation of existing dowel bar designs is the shortening of the functional lifetime of the dowel bar due to corrosion. A zinc coating may be employed as a corrosion-accepting, sacrificial layer over steel, inhibiting steel corrosion. Unfortunately, the role of the zinc coating as a sacrificial anode typically results in the zinc surface becoming extremely roughly surface-textured, which interferes with the desired capability of a dowel bar to offer smooth-outside-surface sliding contact with surrounding concrete in order to accommodate temperature-related expansion and contraction of concrete slabs.

Dowel bars composed of non-corrosive materials have been proposed and tried, but typically fail to provide adequate shear strength or load transfer efficiencies, and thus do not function well as comparably robust, slab-to-slab load transfer devices. Attempts to compensate for the relative lack of shear strength and/or load transfer efficiency have employed greater numbers and/or closer spacing of the dowel bars, thereby increasing overall project expenses.

What is needed is a dowel bar assembly that minimizes material costs but provides comparable, or enhanced, load transfer efficiency versus solid steel dowel bars, while still providing sufficient shear strength and corrosion resistance as well as permitting adequately low resistance to sliding contact with the surrounding concrete.

SUMMARY

This disclosure relates to dowel bar assemblies that incorporate both composite materials and a hollow internal core, including their manufacture, and the apparatus for manufacturing the assemblies. Although the disclosed dowel bar assemblies possess many advantages when used to stabilize and reinforce concrete structures, they may be particularly well-suited for use in concrete highways.

In some aspects, the disclosure may provide dowel bar assemblies that may include an elongate hollow core, a protective jacket coating at least the sidewall exterior of the core, and a sealing structure coupled with each end of the combined core and jacket, wherein the sealing structures are configured to protect the core.

In some aspects, the disclosure may provide a method of manufacturing a dowel bar, that may include preparing an elongate hollow core precursor; coating at least a sidewall exterior of the core precursor with a protective jacket, cross-cutting the jacketed core precursor into segments having a desired length, and capping each end of the core segments with a sealing structure.

In some aspects, the disclosure may provide an apparatus for forming elongate hollow dowel bar assemblies, that may include an advancing mechanism configured to advance an extended hollow core precursor; a core heater, configured to receive and heat the core precursor; a jacket applicator, configured to apply reinforcing fibers and a curable resin to an exterior of the core precursor; a curing apparatus, configured to cure the curable resin; a pultrusion puller, configured to pull the coated core precursor through the curing apparatus to produce a jacketed core precursor; and a crosscutting mechanism configured to cut the jacketed core precursor into segments having a desired length.

The features, functions, and advantages of the disclosed dowel rod assemblies, manufacturing methods, and apparatus may be achieved independently in various aspects of the present disclosure, or may be combined in yet other aspects further details of which can be seen with reference to the following description and drawings.

BRIEF DESCRIPTION OF THE DRAWINGS

FIG. 1 is a semi-schematic view of an illustrative dowel bar assembly according to the present disclosure.

FIG. 2 is a semi-schematic view of an alternative illustrative dowel bar assembly according to the present disclosure.

Figure 3:
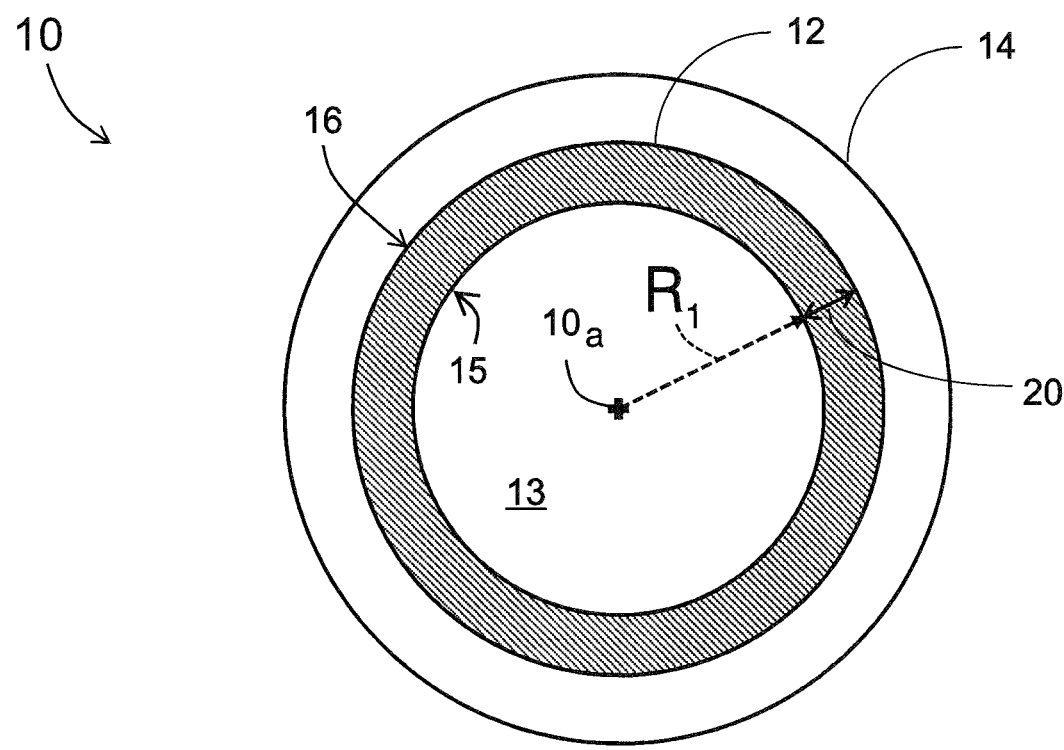
FIG. 3 is a cross-sectional view of dowel bar assembly 10, taken at a location intermediate to the two end sealing structures 18 shown in FIGS. 1 and 2.

Components, structures and positional relationships between elements presented in FIGS. 1-6, inclusive, are depicted so as to more clearly explicate the disclosed elements, and thus are not necessarily drawn to scale.

DESCRIPTION

Overview

Various embodiments of a dowel bar assembly that includes a hollow core, and associated fabrication methods and apparatus, are described below and illustrated in the associated drawings. Unless otherwise specified, the hollow dowel bar assembly and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar apparatuses. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Although the dowel bar assemblies of the present disclosure may be utilized to confer strength and durability to any of a number of concrete structures, or even other types of construction projects, the dowel bar assembles are particularly useful when installed in a high-performance concrete highway in such a manner that they interconnect adjacent concrete slabs, thereby helping to transfer vertical loads between slabs. Typically, such installation would include multiple dowel bar assemblies, laterally spaced, and disposed at about 1-foot lateral intervals along the joints between concrete slabs.

FIG. 1 is a semi-schematic view of an illustrative dowel bar assembly according to the present disclosure, generally indicated at 10. The components of dowel bar assembly 10 include an elongate, cylindrical, and hollow core 12; a coating or jacket 14 that is applied to and protects the outer surface, or exterior sidewall 16, of core 12; and two sealing structures 18 that are coupled to each end of jacket 14 to protect core 12 by sealing it from exposure to moisture.

FIG. 2 is a semi-schematic view of an alternative illustrative dowel bar assembly 10 according to the present disclosure, including an elongate, cylindrical, and hollow core 12; a jacket 14 surrounding the exterior sidewall of core 12, and two sealing structures 18 that are coupled to each end of jacket 14, to protect core 12 from exposure to moisture.

FIG. 3 is a cross-sectional view of dowel bar 10, taken at a location intermediate to the two end plug blanks 18 shown in FIG. 1. As core 12 may be a hollow tube having a central passage 13, the core may have an inner surface 15 disposed at an inner core $R_1$ as measured from the long axis 10a of the dowel bar. Core 12 may have an outer surface 16 to which outer sleeve 14 is bonded. Though core 12 is shown in FIG. 2 as having a circular cross-section, any shape is possible for the cross-section of core 12, end plug blanks 18, and dowel bar assembly 10.

While it should be appreciated that dowel bar assemblies of varying dimensions may be required for a particular application, the dowel bar assemblies of the present disclosure may typically exhibit an overall length (D1 in FIG. 4) of about 12 to about 24 inches, and an outside diameter (D2 in FIG. 4) of about 1 to about 2½ inches. More typically, an exemplary dowel bar may have a length of about 16 to about 18 inches and an outside diameter of about 1½ to about 2 inches. Preferably, the dowel bar assembly has an outer diameter of about 1.7 inches.

Core

Although any number of materials may be used to form the elongate and cylindrical core 12, preferably core 12 is manufactured from a material having a capacity for efficient load transfer, such that after installation in a joint between concrete slabs the dowel bar assembly 10 is capable of efficiently transmitting vertically-applied stresses due to transient loading across the joint to an adjacent concrete slab. Additionally, the core 12 should be selected to exhibit adequate shear strength on the materials encapsulating it, particularly when installed into a poured concrete structure. For at least these reasons core 12 may typically be prepared using a conventional structural steel formulation. In one aspect of the present disclosure, the core is made using ASTM 615 Grade 60 carbon steel.

It was determined that the use of a hollow cylindrical core in place of a solid cylindrical core as described in U.S. Pat. No. 8,591,139, may result in dowel bar assemblies that are substantially lighter than those having solid steel cores. Furthermore, the use of a hollow-core dowel bar assembly results in enhanced load transfer efficiency and reduced corner pressure. In one embodiment, installation of hollow dowel bar assemblies having an outer diameter of 1.7 inches, compared to solid dowel bars having a diameter of 1.5 inches, results in load bearing stress being reduced by 25% and corner pressure being reduced by 27%. The resulting hollow dowel bar assemblies therefore provide equivalent or significantly improved performance with a significant savings in both materials and transportation costs.

Where core 12 extends to the ends of jacket 14 (as shown in FIG. 1), the length of core 12 is necessarily substantially equivalent to the length of the jacket, or a length (D1 in FIG. 4) of about 12 to about 24 inches. Where core 12 is shorter in overall length than jacket 14 (as shown in FIG. 2), the ends 12b of core 12 may be recessed from one or both ends 19 of jacket 14 by about ¼ inch to about 1 inch at each end, or overall ½ inch to 2 inches shorter overall where core 12 is recessed at both ends.

It should be appreciated that the inner diameter of jacket 14 is necessarily related to the outer diameter of hollow core 12 ($D_4$ in FIG. 4), and is typically substantially equal to the outer diameter of core 12, which is about 0.8 to about 2.4 inches. Preferably, core 12 is about 16 to about 18 inches long and has an outside diameter of about 1.5 inches, more preferably core 12 has an outside diameter of 1.625 inches.

The wall thickness 20 of core 12 (see FIG. 3) may be about ¹⁄₁₆ inch to about ¼ inch, and is more typically about ⅛ inch.

Jacket

Protective jacket coating 14 provides multiple advantageous properties to the dowel assemblies of the disclosure. Jacket 14 substantially completely covers the exterior sidewall of core 12, and in conjunction with the sealing structures 18 capping the ends of the dowel assembly 10, protects core 12 from exposure to potential corrosion-causing elements, particularly moisture. In addition, however, by careful selection of the materials used to form jacket 14, the coating can also enhance the strength of the resulting dowel assembly, and function as a "bond breaker" when the dowel bar assembly is set into concrete.

A bond breaker is a layer of a material that is applied to a solid that is being encapsulated in a matrix in order to prevent adhesive bonding between the solid and the matrix material. For dowel bar assemblies, the application of a bond breaker facilitates the ability of the dowel bar to slide within the concrete matrix, thereby accommodating both temperature-related expansion and contraction, and the response of the concrete to high impulse and/or transient loading. This helps to prevent formation of cracks within the concrete.

Although a variety of substances may be applied to dowel bars to function as bond breakers, most are applied in the form of a liquid or semi-liquid, a spray, or a tape wrapping. By encapsulating dowel bar assembly 10 with an appropriately selected material, the dowel bar assemblies of the present disclosure exhibit minimal adhesion with the surrounding concrete without requiring the application of an additional bond breaker material. The efficacy of the protective jacket material in eliminating the need for a bond breaker material may be evaluated by measuring the pullout stress of the dowel bar assembly. A measured pullout stress of less than 60 psi when tested in accordance with AASHTO T253 indicates that the dowel bar assembly will function without the need of an applied bond breaker material.

The protective jacket 14 may comprise a curable plastic resin. The plastic resin may be selected to be cured via the addition of an appropriate curing agent or catalyst, or the plastic resin may be a thermoset plastic. Typically, the plastic is a thermoset plastic that is selected for resilience, durability, and stability. Plastic resin materials that may be useful for forming jacket 14 include conventional urethane-modified thermoset vinylester resin material, such as Dion 31038-00, made by Reichhold Inc. in Durham, N.C., USA.

The plastic resin used to form jacket 14 may additionally include one or more additives intended to confer resistance to photodegradation of the resin. That is, additives may be added to the plastic resin that may help screen the plastic resin from exposure to UV light, potentially preventing or minimizing damage to the dowel bar assemblies that may otherwise occur when they are exposed to direct sunlight.

The properties of jacket 14 may be substantially improved by the incorporation of fibers within the plastic resin matrix. Such reinforced plastics may generally be known as composite materials, as the material combines two (or more) constituents (the fibers and the surrounding matrix) to create a material with substantially different properties than either constituent material. In particular, by incorporating fibers within the plastic resin matrix, jacket 14 may confer substantially improved load transfer efficiency, strength, and shear resistance onto the resulting dowel bar assembly.

When present, the fibers used to reinforce jacket 14 may be uniform or non-uniform, and may have similar or different compositions. In some aspects, the fibers may be polymer-based, including polyester polymers such as polyethylene, or polyamide polymers such as poly-aramid, among others. Alternatively or in addition, the fibers may be derived from natural sources, such as plants, for example flax, hemp, or agave, among others. The fibers may be or include glass fibers, including E-glass, E-CR-glass, S-glass, basalt, or fused quartz fibers. The fibers may include boron fibers or boron nitride fibers. In one illustrative example the fibers may include carbon fibers, such as graphite fibers. The fibers may include woven fibers or non-woven fibers.

Additionally, the fibers used to form jacket 14 may be discrete fibers having little or no arranged orientation in the matrix, or they may be longer fibers that are applied with a shared orientation or architecture that provides advantageous qualities. In a particular aspect of the present disclosure, the fibers used to form jacket 14 may be applied continuously, for example by being wound onto the core 12 with an appropriate plastic resin in a desired pattern, followed by pultrusion as will be discussed below.

In one aspect of the disclosure, jacket 14 may include up to three different, or differentiated, examples of reinforcing fibers embedded in a plastic matrix. The reinforcing fibers may be made of glass, and more preferably E-glass (alumino-borosilicate glass with less than 1% w/w alkali oxides). Alternatively, or in addition, the reinforcing fibers may be made from a thermoplastic polymer.

Selected examples of reinforcing fibers may include (1) glass-fiber roving, (2) glass-fiber mat, and (3) glass-fiber veil materials. In glass-fiber roving materials, the glass fibers of the matrix are elongate and may be oriented substantially parallel to the longitudinal axis $10_a$ of the dowel bar assembly 10. In glass fiber mat materials, the glass fibers are utilized in the form of a sheet or mat having randomly oriented fibers. In glass fiber veil materials, the sheet or mat includes more evenly dispersed glass fibers that may exhibit some degree of orientation within the sheet. Typically, the composition of jacket 14 is selected so that the glass fibers incorporated in the jacket make up about 60% by weight of the entire jacket.

In the case of fiber veil materials, the reinforcing fibers may include a thermoplastic polymer, such as thermoplastic polyester. Suitable spun polyester veil materials may be commercially obtained under the tradename REEMAY.

Each type of the glass fiber reinforcing materials may be obtained commercially in a wide variety of choices, sizes, and other characteristics, and may freely be selected for use in the manufacture of the disclosed dowel bar assemblies. Representatively, fiber-reinforcing materials which have been found to be well-suited for use in many high-performance highways include: (a), for mat material, continuous-strand glass fiber products made and offered by Owens Corning in Pennsylvania, USA; (b), for roving material, a selection drawn from the products also made by Owens Corning; and (c), for veil material, what are referred to respectively as "tissue veil" and "veil cloth" products made available by Freudenberg Nonwovens in Durham, N.C., and Xamax in Seymour, Conn.

Figure 4:
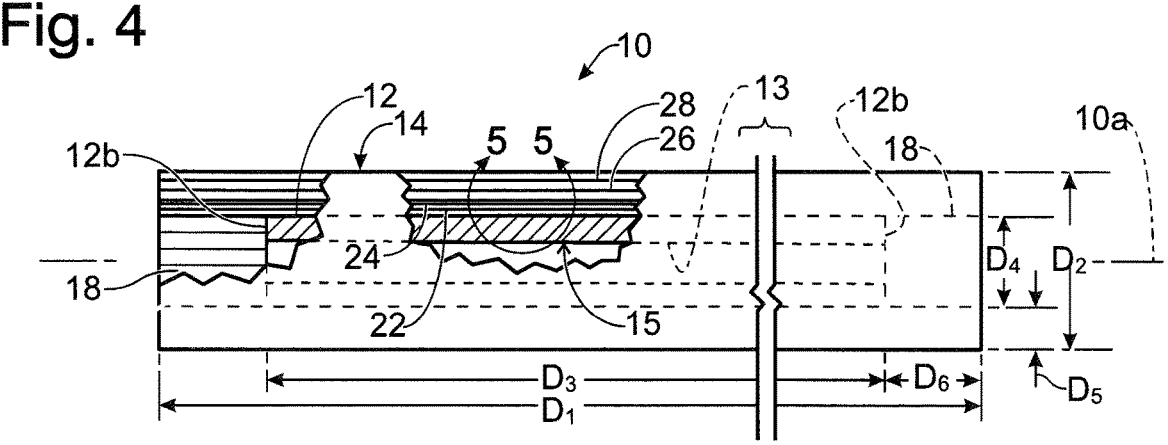
FIG. 4 is an enlarged-scale, fragmentary, side elevation of dowel bar assembly 10 of FIG. 2, with portions broken away to illustrate details of internal construction.
Figure 5:
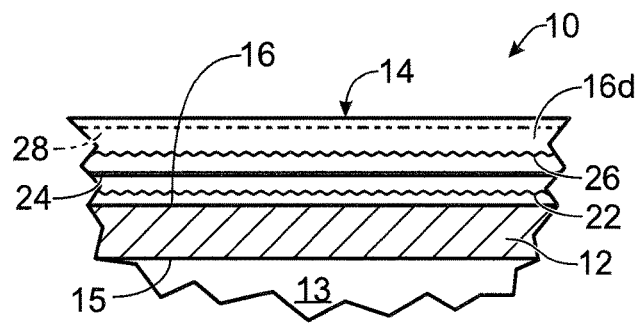
FIG. 5 is an even larger-scale, fragmentary illustration of the sidewall of dowel bar assembly 10 of FIG. 2, focusing on the region in FIG. 3 which is embraced by the curved arrows shown at 5-5.

An illustrative embodiment of a dowel bar assembly 10 according to the present disclosure is depicted in FIGS. 4 and 5. As shown, jacket 14 includes a total of four concentric layers that incorporate reinforcing fibers, shown at 22, 24, 26, and 28.

Layer 22, which appears as a wavy line in FIG. 4, may include a glass fiber mat material. Layer 24, which appears as a thickened, straight line in FIG. 4, may include a glass fiber roving material. Layer 26, which also appears as a wavy line in FIG. 4, may include a glass-fiber mat material. And, layer 28, which appears as a thin, straight, dash-double-dot line in FIG. 4, may include glass-fiber veil material.

Without wishing to be bound by theory, the incorporation of fiber mat materials having randomly oriented fibers into jacket 14 may help to reduce the tendency of the plastic material of the jacket from splitting or cracking longitudinally when under stress. Alternatively, or in addition, one or more applications of fiber mat may be replaced by winding fibers onto the core at an off-axis angle to provide enhanced mechanical toughness and impact resistance. More preferably, fiber may be wound onto the core at two different and complementary off-axis angles, to further increase stiffness and resistance to splitting. In one embodiment of the disclosure, two sets of fibers may be wound onto the core to form jacket 14 at complementary angles ranging from +30° and −30° to angles of +60° and −60°. In a preferred embodiment, two sets of fibers are wound into the jacket at off-axis angles of +45° and −45°, respectively, from the longitudinal axis 10*a*.

It should be appreciated that jacket 14 may include any useful combination of reinforcing fibers, types of reinforcing fibers, and distribution of reinforcing fibers within the plastic resin matrix forming the jacket, including a jacket that includes a single discrete layer incorporating a type of reinforcing fiber. Alternatively, or in addition, any combination of two or more of the representative layers 22, 24, 26, and 28 may be disposed within jacket 14 in an alternative layer order. In one particular alternative embodiment of the dowel bar assembly of the present disclosure, jacket 14 may include only three of the four layers depicted in FIGS. 3 and 4: a mat-material layer 22, a roving-material layer 24 disposed outwardly of layer 22, and a veil-material layer 28 disposed outwardly of roving-material layer 24.

Sealing Structures

Each dowel bar assembly 10 includes sealing structures 18 that are configured to substantially seal the open ends of the combined core 12 and jacket 14 so as to help protect the core from exposure to moisture, which may lead to corrosion. Any shape or composition of sealing structure that adequately protects core 12 from exposure to moisture and/or other corrosive materials is a satisfactory sealing structure for the purposes of the present disclosure.

Where core 12 and jacket 14 have substantially equal lengths, as shown in FIG. 1, the ends of the dowel bar assembly 10 may be sealed by the application of insertable caps 30. Each cap 30 includes an insert portion 32 and a capping portion 34. Insert portion 32 is configured to be inserted into the open end of combined core and jacket 36, i.e., into the hollow interior of core 12. Insert portion 32 of cap 30 should be shaped so as to create a moisture-proof seal when inserted into the hollow interior 13 of core 12. For example, as shown in FIG. 1, insert portion 32 of cap 30 may include one or more protrusions 38, such as flange structures or ribs, that can enhance the frictional fit between the insert portion and the core interior. Alternately or additionally, cap 30 may be screwed into the end of core 12 if one or both of insert portion 32 and inner surface 15 includes complementary threads. Any structure that serves a similar purpose may be used in place of, or in addition to, the depicted protrusions 38.

It should be appreciated that capping portion 34 may have a circumference substantially equal to the outside diameter of jacket 14, so as to completely protect the ends of the combined jacket and core 36. Alternatively, the circumference of capping portion 30 may be large enough to substantially cover the exposed end of core 12, i.e., substantially equal to the outside diameter of core 12 ($D_4$) so that the core material is protected from the environment.

Alternatively, or in addition, cap 30 may be sealed to the ends of the core 12 and/or jacket 14 using a sealant material, such as a caulk, an adhesive, or other material. While curable materials may be used to enhance a permanent seal between the cap and the dowel bar assembly, non-curable materials may also be used, such as TEFLON tape, plumber's grease, and the like.

Cap 30 may be made of any appropriate material or combination of materials, for example rubber, plastic, or any other material capable of withstanding the environment within a concrete structure. Caps 30 may be prepared for example by injection molding. A variety of such insertable caps or plugs are commercially available.

In an alternative embodiment of the present disclosure, the core 12 does not extend fully to the ends of the jacket 14, and the ends of the jacket 14 are sealed with end plugs 40, as described in U.S. Pat. No. 8,591,139. Such end plugs 40 may include elongate roving reinforcing fibers in a plastic resin matrix. The reinforcing fibers may be distributed throughout the plastic resin matrix of the plugs, and may be oriented so as to extend substantially parallel to the longitudinal axis of the dowel bar assembly $10_a$.

As will be discussed below, in this embodiment the jacket 14 may be formed via pultrusion over an alternating sequence of core segments and plug segments, followed by cross-cutting through the plug segments to form the dowel bar assembly. By manufacturing the jacket 14 in this way, the jacket material is not subjected to contact with any sharp-edged, high-stress, surface discontinuity regions within the dowel bar assembly.

Where the sealing structures 18 are end plugs 40, they may be fabricated from a conventional thermoset polyester material made by Razor Composites in Baraboo, Wis. Sleeve end plugs 40 may have a length ($D_6$ in FIG. 3) of about 1 inches, and a circular cross section or diameter substantially equal to the outer diameter of core 12, and thus the inner diameter of jacket 14.

Manufacturing Apparatus

The dowel bar assemblies 10 of the present disclosure may be fabricated using a pultrusion apparatus for example as described in U.S. Pat. No. 8,591,139 and depicted semischematically in FIG. 6.

Figure 6:
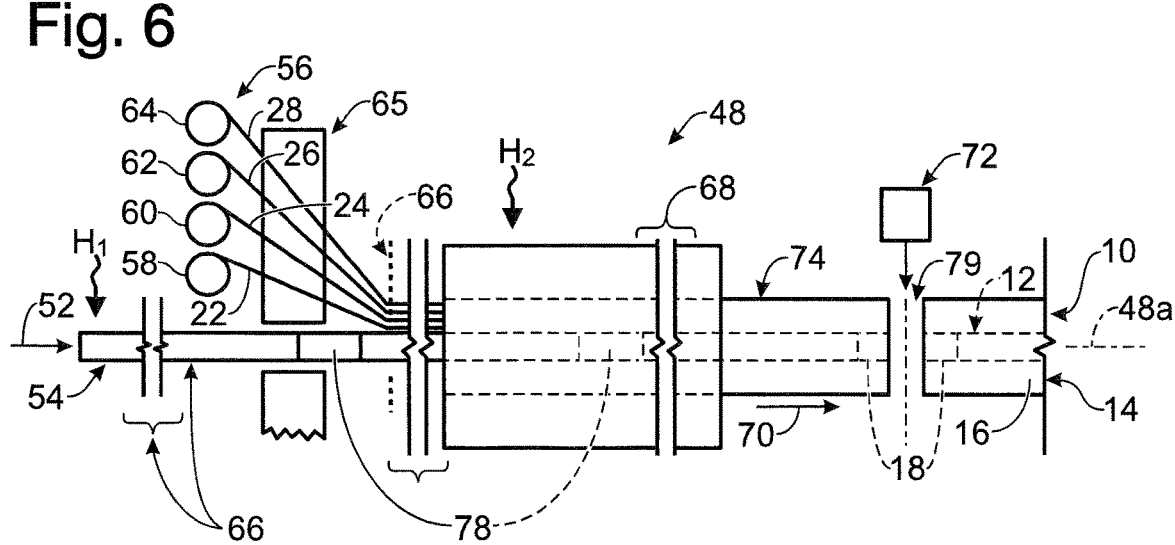
FIG. 6 is a schematic and fragmentary side elevation view of an apparatus for the pultrusion-based manufacture of the disclosed composite-material hollow dowel bar assemblies, such as that pictured in FIGS. 1 and 2.

FIG. 6 illustrates, at 68, an apparatus for implementing the pultrusion-based manufacture of dowel bar assemblies of the present invention.

Progressing from left to right, i.e., from upstream to downstream ends of apparatus 48, across FIG. 6, apparatus 48 includes (1) an advancing mechanism, or core-train pusher, 52, simply represented by a darkened arrow whose arrowhead points in the direction of processing flow through apparatus 48, (2) a core-train formation, or forming, station 54, (3) a core heater $H_1$ which is disposed within station 54 and designed to heat cores 12, as will be further explained, to a temperature of about 150° F. before the actual process of jacket formation via pultrusion begins, (4) a reinforcing fiber supply station 56 which, represented necessarily just in the plane of FIG. 6 (i.e., on one side only of pultrusion-formation axis 48*a*), is seen to include herein four, reinforcing-fiber-material distributing devices that are illustrated as rotary fiber-delivery spools 58, 60, 62, 64—devices that are merely representative of any number of variations in user-selectable, conventional structures designed to pay out, respectively, elongate, fiber-material runs, such as those appearing as straight, angularly inclined lines in FIG. 6, of for example glass fiber mat material 22, glass fiber roving material 24, glass fiber mat material 26, and glass fiber veil material 28, (5) a resin fiber bathing, or resin bathing, station 65, and a fiber guide station 66 which, like fiber supply station 56, are respectively pictured necessarily just in the plane of FIG. 6 only on one side of axis 48*a*, (6) another heater, $H_2$, (7) a conventional, and appropriately sized pultrusion die 68, the inside of which is heated to a temperature of about 280° F. by heater $H_2$ (pultrusion die 68 is depicted herein with a length of about 5- to 6-feet, and an internal, elongate, cylindrical pultrusion channel with a diameter of about 1½-inches), (8) a conventional, power-driven, pultrusion puller of any suitable design, such as a crawler tread design, represented simply by a darkened arrow 70, operable herein to establish a pultrusion throughput speed of about 3 to about 7 feet-per-minute, more preferably about 5 feet-per-minute, and (9) a suitable cross-cutting mechanism 72 which is employed to cross cut what is referred to herein as a pultrusion result, intermediate, dowel bar product, such as that designated 74 in FIG. 6, that is emerging from die 68. A fragmentary, end portion of a finished, cut-separated dowel-bar 10 is pictured to the right of cutter 72.

It should be understood that, while four, fiber-delivery spools (devices) have been illustrated in FIG. 6 in order to relate to a discussion regarding the delivery of fiber-reinforcing materials suitable to create four layers within a jacket 14, in the context of fabricating a sleeve having only three layers within it, only three such delivery spools (devices) would be required, and, in terms of what is illustrated in FIG. 6, these three spools would include spools 58, 60 and 64.

Further discussing what has just been described respecting FIG. 6, the three, upstream processing stations, and the associated structures illustrated therein, which are involved with (1) supplying, i.e., paying out, from suitable delivery devices, such as the representatively pictured delivery spools, elongate runs of the several different kinds of reinforcing fiber materials, (2) for bathing the these reinforcing-fiber-material runs en route to the pultrusion die with the appropriate plastic resin, and (3) for guiding the bathed fiber material runs into the infeed, upstream end of the pultrusion die, must necessarily be constructed, and this may be done in entirely conventional, user-chooseable manners, so as to be distributed relatively evenly around, i.e. circumferentially around, pultrusion-forming axis 48a so that a sleeve or jacket 14 ultimately becomes pultrusion-formed uniformly circumferentially around a core 12. Just how this circumferential distribution of paying out, bathing and guiding equipment is organized, and what particular type of such equipment is employed, is entirely a matter of user/designer choice.

Located preferably adjacent both (1) the upstream, or infeed, and (2) the downstream, or discharge, ends of apparatus 48, are suitable track-like, such as trough-like, and preferably, though not necessarily, stationary, support structures, not illustrated herein, that provide appropriate, underlying support (a), adjacent the upstream end of the apparatus for what will shortly be described as a stream of elements that make up a pre-pultrusion core-train of dowel-bar central elements (i.e., endo-abutting, longitudinally alternating cores and end-plug blanks) that are to be fed into die 68 for pultrusion forming of jacket structure 14, (b), adjacent the downstream end of the apparatus, and of die 68, for the emerging intermediate, pultrusion-result, dowel-bar product, such as that shown at 74, and (c), beyond cross-cutter 72, for the finished and thereafter separated dowel bars 10. Other modes, etc., of underlying "component-throughput-transport" support may, of course, be implemented.

While the process of sleeve formation herein is clearly a pultrusion-based process, at the extreme upstream end of apparatus, there are engaged herein, as will now be described, upstream, core forming and core advancing operational stages that relate to the needed formation, and then the downstream transport, of the components corresponding to the horizontal, linear feed entering station 54 for feeding from that station toward stations 65, 66, and pultrusion die 68.

Where the desired dowel bar assembly corresponds to the dowel bar assembly of FIG. 1, that is where the core 12 extends substantially the length of jacket 14, the horizontal, linear feed entering station 54 is made up on a continuous and tubular core precursor, such as a cylindrical steel tube. However, the apparatus of FIG. 6 is depicted as fabricating a desired dowel bar assembly that corresponds to the dowel bar assembly of FIG. 2, where jacket 14 extends beyond the length of core 12 and the sealing structures 18 that are used are end plugs 40 fitting within jacket 14. As shown in FIG. 6, the horizontal, linear feed being advanced by mechanism 52 is a continuous train of endo-abutting, longitudinally alternating, elongate, cylindrical, high load transfer efficiency, high-shear-strength, steel cores 12, and shorter, elongate, cylindrical and matching-cross-section, plastic-resin and fiber-reinforced, pre-pultruded sleeve end-plug blanks 78. One such end-plug blanks is disposed just upstream from die 68, and the other is disposed within the die. As will become apparent shortly, each end-plug blank has a length which is about twice that of the desired finished end plug 40, and in one aspect the length may be about 2 inches.

Considering now the overall dowel-bar formation pultrusion process proposed by the present invention, as the linear core precursor, or core train, including endo-abutting, longitudinally alternating cores and end-plug blanks, is suitably formed along a line in forming station 54. Within this station, as the formed core train is moved by pusher 52 toward the pultrusion die, and by appropriately timed and staged operation of previously described heater $H_1$, which may take any suitable form of a heater selected by the user, and which may conveniently and conventionally be operated under the control of a suitably programmed, digital computer (not part of the present invention), the steel cores in the train are preferably heated, as mentioned earlier herein, to a temperature of about 150° F. Such heating is preferably done in order to prevent the cores, during processing within pultrusion die 68, from acting as undesired heat sinks which could retard, and perhaps interfere with, appropriate curing of the resin which coats the fiber reinforcing materials within the die.

The formed core precursor, with either its extended steel core material or alternating core segments and end-plug precursors, is moved from the forming station toward and into the die by advancing mechanism 52, which is operated in any appropriate fashion, entirely selectable by the user, to shift the core precursor components at an appropriate rate toward and into the pultrusion die, and in a manner so as to accommodate, as far as the operational limitations of the pultrusion die may be considered, a substantially steady and effectively continuous stream of freshly die-introduced core precursor.

There are many conventional ways that a pusher, such as schematically illustrated pusher 52, may be constructed and operated so as (1) to permit easy, essentially continuous assembly in station 54 of a progressively formed core precursor, and (2), at appropriate moments to push the precursor assembly so that the pultrusion die will experience a continuity inflow of core precursor. Those skilled in the art will recognize that once the substantially "endless" core precursor, or core train, is pushed to an appropriate location along pultrusion-formation axis 48a, is sufficiently disposed within the pultrusion die, and specifically sufficiently contained therewithin so that resin-coated, fiber reinforcing, sleeve material has begun to stick to the core train, the downstream operation of puller 60 "takes over" in conventional pultrusion fashion, and thereafter functions to continuously drive the downstream-directed, flowing motion of all within the die.

Where the core precursor assembly includes alternating cores and end-plug blanks, proper endo abutment between the cores and end-plug blanks in the assembly during the core train forming process, and the associated moving of a formed core train into die 68, may depend upon the opposite ends of the alternating cores and end-plug blanks lying correctly in parallel planes that are disposed normal to the respective long axes of these components.

While the core precursor is being advanced, the desired number of reinforcing fiber materials such as 22, 24, 26, and 28 is applied in a continuous manner to the core precursor, as shown in FIG. 6. The reinforcing fiber materials are (1) paid out from the spools in fiber supply station 56, (2) are led through resin bathing station 65 wherein they are bathed in, and wetted with, the selected plastic resin, and thereafter (3) guided through, and by, guide station 66 toward and into the intake end of pultrusion die 68, appropriately disposed, circumferentially about apparatus axis 48a, and, of course, in the appropriate radially organized layer arrangement, which has been mentioned earlier herein, distributed circumferentially around the now centrally (on axis 48a) located core precursor so as to be arranged, within the pultrusion die, for the correct formation of a jacket 14.

If, as discussed previously, a jacket having three layers of reinforcing fibers is desired, the reinforcing fiber material may be delivered from spools 22, 24, and 28. Alternatively, if the embodiment having four layers of reinforcing fibers is desired, the reinforcing fibers may be delivered from all four, illustrated spools. Also as discussed previously, the number and character of the jacket layers, and the number of reinforcing fibers employed in the manufacture of the dowel bar assemblies, is a matter of design choice.

Within pultrusion die 68, as the through-moving core precursor and the associated, surrounding, wetted reinforcing fiber materials pass through the die, an appropriate level of heat is applied by heater $H_2$. Typically, die 68 is heated to an internal temperature of about 280° F. This heating, coupled with the attendant contact with a moving surface which occurs with the internal, cylindrical pultrusion channel within the die, causes the resin-coated mass of material to form appropriately around the core precursor in the configuration of what is to become the surrounding jacket 14. The heating of die 68 and the degree of internal heating is selected so that the plastic resin material is effectively substantially cured. This curing is to some extent aided by heat radiated from the pre-heated steel core precursor which, because of its pre-heated condition, does not negatively act as an undesirable heat sink within the die.

It will be well understood by those skilled in the art that (1) the rate of throughput of materials established selectively in apparatus 48 in the formation of dowel bars, (2) the selected level of internal-die heating which is created by heater $H_2$, and (3) the overall length of die 68, per se, are appropriately determined by the specifically chosen sizes of the materials that are to be employed in the making of a particular size and character of a dowel bar assembly 10, and in relation to the formation curing characteristics of the chosen plastic resin material.

As has been mentioned herein, what emerges continuously during dowel-bar-making, from the downstream, discharge end of die 68, is what has been referred to hereinabove as an intermediate pultrusion-result dowel-bar product (or jacketed core intermediate) as seen at 74 in FIG. 6.

Figure 7:
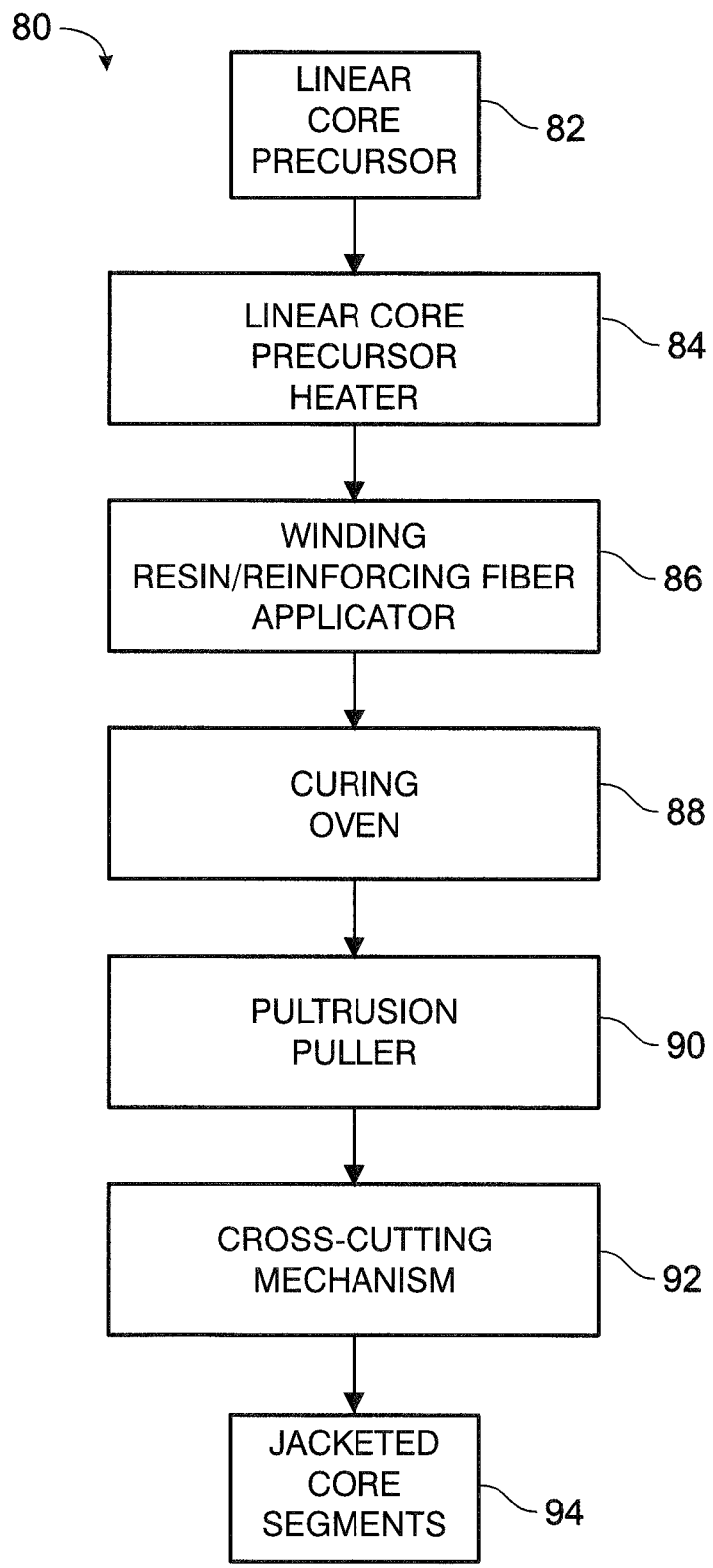
FIG. 7 is a block/schematic diagram illustrating a portion of a manufacturing process of the dowel bar assemblies of FIGS. 1 and 2.
Figure 8:
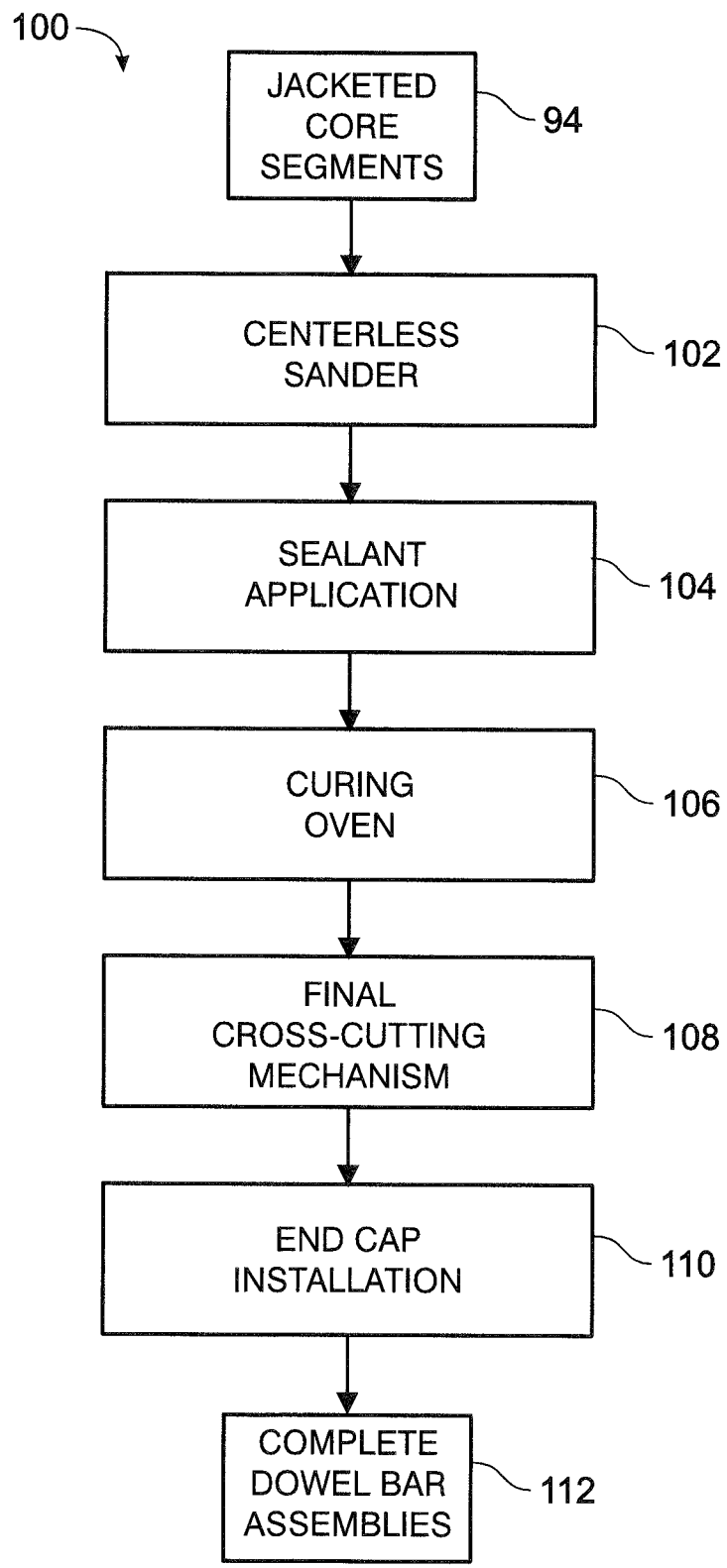
FIG. 8 is a block/schematic diagram illustrating an additional portion of the manufacturing process of FIG. 7.

In an alternative aspect of the disclosure, where the reinforcing fibers are applied by winding them onto the core precursor, the resin and wound fiber layers coating the core precursor may be cured by pulling the core precursor through a curing oven, instead of pulling the coated core precursor through the heated die 68. An example of such a process is shown in FIGS. 7 and 8, and in particular at box 88 of flowchart 80.

Downstream from die 68 or an appropriate curing oven, and under appropriate operational and timing control, such as might be implemented by a suitably programmed digital computer, crosscutting mechanism 72 may be operated to produce a cross cut in this emerging "intermediate" product, with each such cut being made at a location to generate a dowel bar assembly of the desired length.

Where the jacketed core intermediate includes alternating steel cores and end-plug precursors, the cross-cutting mechanism may be configured to cut the intermediate at a point that is substantially exactly midway between the opposite ends of each core-plug blank. Such a cross cut is shown generally at 79 in FIG. 6.

The result of this operation is, of course, separation, one after another, of completed jacketed core segments. Where the jacketed core segments incorporate end-plugs, the result is a completed dowel bar assembly 10. However, where the cross-cut segments are not already capped by a sealing structure 18, the resulting segments may be sealed by the insertion at each end of a cap or plug 30, as discussed above with respect to the embodiment of FIG. 1.

Method of Manufacture

The apparatus described above lends itself to the performance of various methods of manufacturing dowel bar assemblies, as disclosed herein. A representative method of manufacture is shown in flowchart 80 of FIG. 7, which depicts an order of manufacturing operations beginning with an input of the linear core precursor 82 into the linear core precursor heater at 84. The heated core precursor is in passed through the winding resin/reinforcing fiber applicator at 86, and then into the curing oven $H_2$ to cure the resin at 88. The wrapped or jacketed core intermediate is then drawn through the pultrusion puller at 90, and the resulting extended jacketed core is cross-cut to the desired lengths at 92 to produce jacketed core segments utilized to prepare the capped dowel bar assemblies as represented by FIG. 1.

As shown in flowchart 100 of FIG. 8, the jacketed core segments 94 may in turn be smoothed using a centerless sander, as shown at 102, and then sealant may be applied to the core segments at 104. The sealed core segments may then be heated in a curing oven at 106, followed by a final cross-cutting at 108, and installation of appropriate end caps 30 at 110, to yield complete dowel bar assemblies 10 at 112.

This manufacturing scheme may be modified or varied, as is well understood by one of skill in the art, without departing from the spirit of the invention. For example, for some formulations, the plastic resin applied to the reinforcing fibers to form jacket 14 may be cured and hardened at least in part by exposure to UV radiation, rather than solely by heating. Additionally, or in the alternative, the application of sealant to the core segments at 104 of flowchart 100 may include or further comprise the application of a UV light-protective screening material, so as to prevent or minimize exposure of the plastic resin of jacket 14 to UV light, and thereby help prevent photodegradation, such as may occur during storage particularly in direct sunlight.

Figure 9:
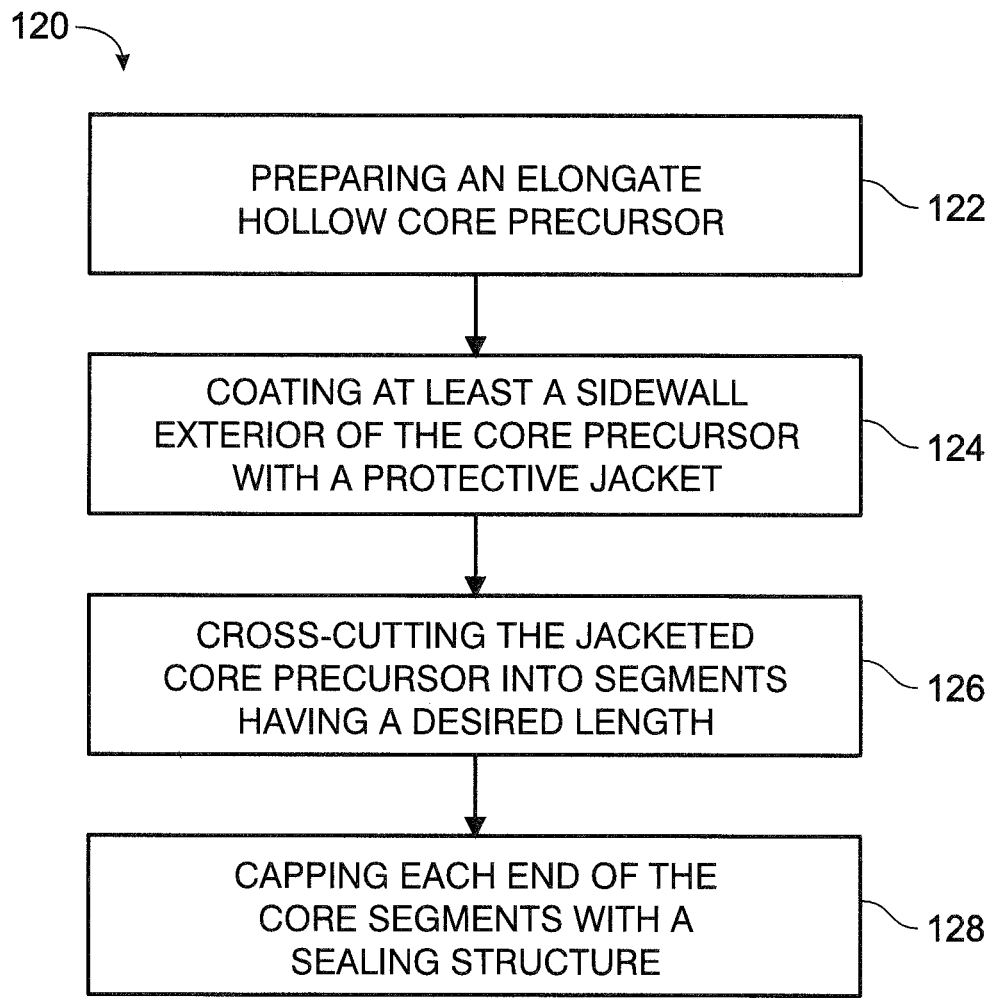
FIG. 9 is a flowchart illustrating a method of manufacturing a dowel bar assembly, according to an illustrative embodiment of the disclosure.

An alternative flowchart 120 of FIG. 9, also depicts a method of manufacturing a dowel bar assembly that includes preparing an elongate, cylindrical and hollow core precursor at 122; coating the sidewall exterior of the core precursor with a protective jacket at 124; cross-cutting the jacketed core precursor into segments having a desired length at 126; and capping each end of the jacketed core segments with a sealing structure at 128.

Accordingly, the present invention features a special pultrusion-based fabrication methodology, in certain variations for creating a pair of modifications of important, new, advanced-performance and significantly-enhanced-longevity highway dowel bars. Variations and modifications are, of course, possible which will come within the spirit of the invention, and which may well come to the minds of those generally skilled in the relevant art.

Advantages, Features, Benefits

The different embodiments of the hollow dowel bars described herein provide several advantages over known solutions for creating a dowel bar that is light-weight and long-lived. For example, the illustrative embodiments of the hollow dowel bars described herein allow for a more light-weight dowel bar as compared to a solid dowel bar without a corresponding loss in load transfer efficiency. No known system or device can perform these functions, particularly as a composite-material dowel bar. Thus, the illustrative embodiments described herein are particularly useful for concrete structures. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A dowel bar assembly, comprising:
    an elongate hollow core;
    a protective jacket coating at least a sidewall exterior of the core, the protective jacket including a fiber-reinforced thermoset plastic resin having multiple layers of reinforcing fibers, wherein at least some of the layers of reinforcing fibers include fibers wound onto the core at an off-axis angle to a longitudinal axis of the core; and
    a sealing structure coupled with each end of the combined core and jacket,
    wherein the sealing structures are configured to protect the core.

2. The dowel bar assembly of claim 1, wherein the core includes a tube having a cross-section that is circular, elliptical, or oval.

3. The dowel bar assembly of claim 1, wherein the core is a hollow cylinder.

4. The dowel bar assembly of claim 1, wherein the core is selected to have a high load transfer efficiency.

5. The dowel bar assembly of claim 1, wherein the core is structural steel.

6. The dowel bar assembly of claim 1, wherein the protective jacket is configured to serve as a bond breaker coating for the dowel bar assembly.

7. The dowel bar assembly of claim 1, wherein the elongate hollow core includes carbon steel;
    the protective jacket includes multiple layers of reinforcing fibers that are either glass reinforcing fibers or thermoplastic polymer reinforcing fibers; and
    the sealing structures are either end caps or sleeve end plugs that seal the core from the environment.

8. The dowel bar assembly of claim 1, wherein the sealing structures are sleeve end plugs disposed within the protective jacket and sealing the core from the environment.

9. The dowel bar assembly of claim 1, having an overall length of about 12 to about 24 inches, and an outside diameter of about 1.7 inches.

10. The dowel bar assembly of claim 1, wherein the multiple layers of reinforcing fibers include one or more of glass reinforcing fibers and thermoplastic polymer reinforcing fibers.

11. The dowel bar assembly of claim 1, wherein the multiple layers of reinforcing fibers include one or more of a glass fiber roving, a glass fiber mat, and a glass fiber veil material.

12. A dowel bar assembly, comprising:
    an elongate hollow core;
    a protective jacket coating at least a sidewall exterior of the core, the protective jacket including a thermoset plastic resin reinforced by one or more reinforcing fibers; and
    a sealing structure coupled with each end of the combined core and jacket,
    wherein the sealing structures are end caps inserted into the core interior that seal the core from the environment.

13. The dowel bar assembly of claim 12, wherein the sealing structures are sleeve end plugs disposed within the protective jacket and sealing the core from the environment.

14. The dowel bar assembly of claim 12, having an overall length of about 12 to about 24 inches.

15. The dowel bar assembly of claim 12, having an outside diameter of about 1.7 inches.

16. The dowel bar assembly of claim 12, wherein the hollow core precursor includes a tube having a cross-section that is circular, elliptical, or oval.

17. The dowel bar assembly of claim 12, wherein the hollow core precursor is a hollow cylinder of structural steel.

18. The dowel bar assembly of claim 12, wherein the hollow core precursor is selected to have a high load transfer efficiency.

19. The dowel bar assembly of claim 12, wherein the protective jacket is configured to serve as a bond breaker coating for the dowel bar assembly.

20. The dowel bar assembly of claim 12, wherein at least some of the layers of reinforcing fibers include fibers oriented at an off-axis angle to a longitudinal axis of the core.

21. The dowel bar assembly of claim 12, wherein the multiple layers of reinforcing fibers include one or more of glass reinforcing fibers and thermoplastic polymer reinforcing fibers.

22. The dowel bar assembly of claim 12, wherein the multiple layers of reinforcing fibers include one or more of a glass fiber roving, a glass fiber mat, and a glass fiber veil material.

23. A method of manufacturing a dowel bar, comprising:
preparing an elongate hollow core precursor;
coating at least a sidewall exterior of the core precursor with a protective jacket of thermoset plastic resin by pultrusion-forming a fiber-reinforced plastic-resin sleeve continuously and bondedly around the core precursor to form a jacketed core precursor; wherein pultrusion-forming the fiber-reinforced plastic-resin sleeve includes continuous dispensing of a plurality of reinforcing fibers, applying a curable plastic resin to the reinforcing fibers, and guiding the resin-soaked fibers into a circumferential layer structure having the fibers oriented at an off-axis angle relative to a longitudinal axis of the core precursor, the circumferential layer structure circumsurroundingly disposed onto an outside surface of the jacketed core precursor;
cross-cutting the jacketed core precursor into segments having a desired length; and
capping each end of the core segments with a sealing structure.

24. The method of claim 23, wherein preparing the elongate hollow core precursor includes preparing a core precursor having a cross-section that is circular, elliptical, or oval.

25. The method of claim 23, wherein the core precursor includes a hollow cylinder.

26. The method of claim 23, wherein preparing the jacketed core precursor includes longitudinally alternating a plurality of core segments with end-plug blanks having an outside diameter substantially equal to the outside diameter of the core segments; and
cross-cutting the jacketed core precursor includes sawing across the end-plug blanks so that each jacketed core segment is effectively capped.

27. The method of claim 23, wherein the elongate hollow core precursor has a circular cross-section and includes carbon steel.

* * * * *